(12) United States Patent
Biebuyck

(10) Patent No.: US 9,532,507 B2
(45) Date of Patent: Jan. 3, 2017

(54) GUIDE SYSTEM FOR A PLUNGER OF A RECTANGULAR BALER

(71) Applicant: CNH Industrial America LLC, New Holland, PA (US)

(72) Inventor: Ronald Biebuyck, Veurne (BE)

(73) Assignee: CNH Industrial America LLC, New Holland, PA (US)

( * ) Notice: Subject to any disclaimer, the term of this patent is extended or adjusted under 35 U.S.C. 154(b) by 196 days.

(21) Appl. No.: 14/406,689

(22) PCT Filed: Jun. 11, 2013

(86) PCT No.: PCT/EP2013/061988
§ 371 (c)(1),
(2) Date: Dec. 9, 2014

(87) PCT Pub. No.: WO2013/186196
PCT Pub. Date: Dec. 19, 2013

(65) Prior Publication Data
US 2015/0150193 A1    Jun. 4, 2015

(30) Foreign Application Priority Data

Jun. 13, 2012 (BE) .................................. 2012/0395

(51) Int. Cl.
*A01F 15/04* (2006.01)
*B30B 15/04* (2006.01)
(Continued)

(52) U.S. Cl.
CPC ............... *A01F 15/08* (2013.01); *A01F 15/04* (2013.01); *A01F 15/042* (2013.01);
(Continued)

(58) Field of Classification Search
CPC .. A01F 15/0841; A01F 15/042; A01F 15/046; A01F 15/04; A01F 15/08; B30B 9/306; B30B 9/3021; B30B 9/3032; B30B 1/266; B30B 15/041; B30B 9/305; Y10T 4/2142; Y10T 403/553; Y10T 403/555
(Continued)

(56) References Cited

U.S. PATENT DOCUMENTS 2,720,160 A * 10/1955 Tice ...................... A01F 15/042
100/179
3,059,569 A * 10/1962 Nolt ........................ A01F 15/04
100/179
(Continued)

FOREIGN PATENT DOCUMENTS

| GB | 813393 A  | 5/1959 |
| GB | 846396 A  | 8/1960 |
| GB | 1161650 A | 8/1969 |

*Primary Examiner* — Jimmy T Nguyen
(74) *Attorney, Agent, or Firm* — Patrick M. Sheldrake

(57) ABSTRACT

A rectangular baler including a bale chamber; a plunger; a guide system including a guide assembly for aligning and supporting the plunger in a transverse direction; each guide assembly including a mounting piece with a guide element, a threaded shaft; wherein the mounting piece has a mounting surface which is fixed against a guide surface of a member; the mounting piece and the member having an elongated slot and a through-hole, respectively, or a through-hole and an elongated slot, respectively; the threaded shaft extending through the through-hole and the elongated slot and having an axis making an angle with respect to the guide surface which is smaller than 90 degrees.

14 Claims, 10 Drawing Sheets

(51) Int. Cl.
*A01F 15/08* (2006.01)
*B30B 9/30* (2006.01)

(52) U.S. Cl.
CPC .......... *A01F 15/046* (2013.01); *B30B 9/305* (2013.01); *B30B 9/3021* (2013.01); *B30B 15/041* (2013.01)

(58) Field of Classification Search
USPC .................. 100/178, 179, 240, 245; 56/341
See application file for complete search history.

(56) References Cited

U.S. PATENT DOCUMENTS

| | | |
|---|---|---|
| 3,552,307 A | 1/1971 | Vanable |
| 4,135,445 A * | 1/1979 | Smith .................. A01F 15/042 100/179 |
| 5,642,662 A * | 7/1997 | Schwelling ........... B30B 9/3032 100/245 |
| 9,101,091 B2 * | 8/2015 | Biebuyck .............. A01F 15/042 |

* cited by examiner

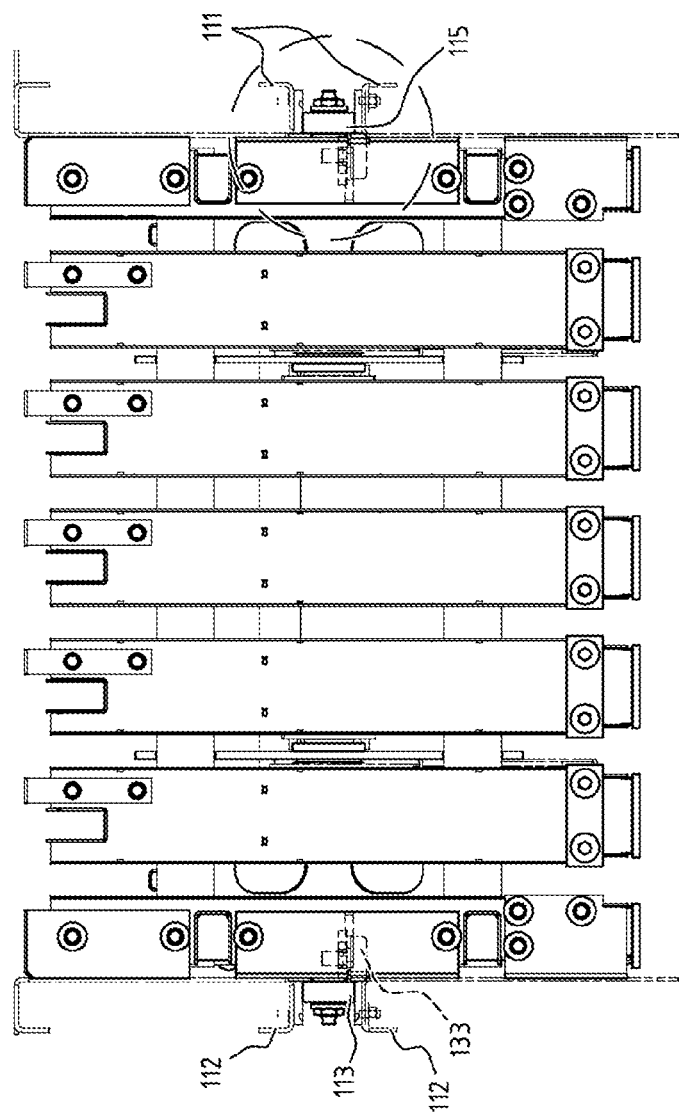

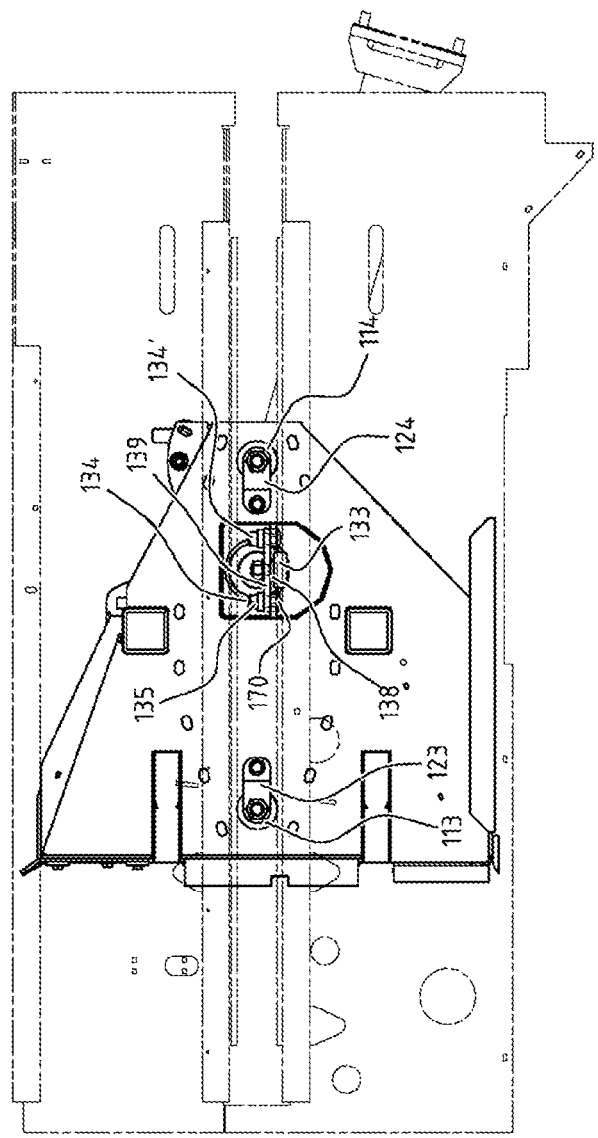

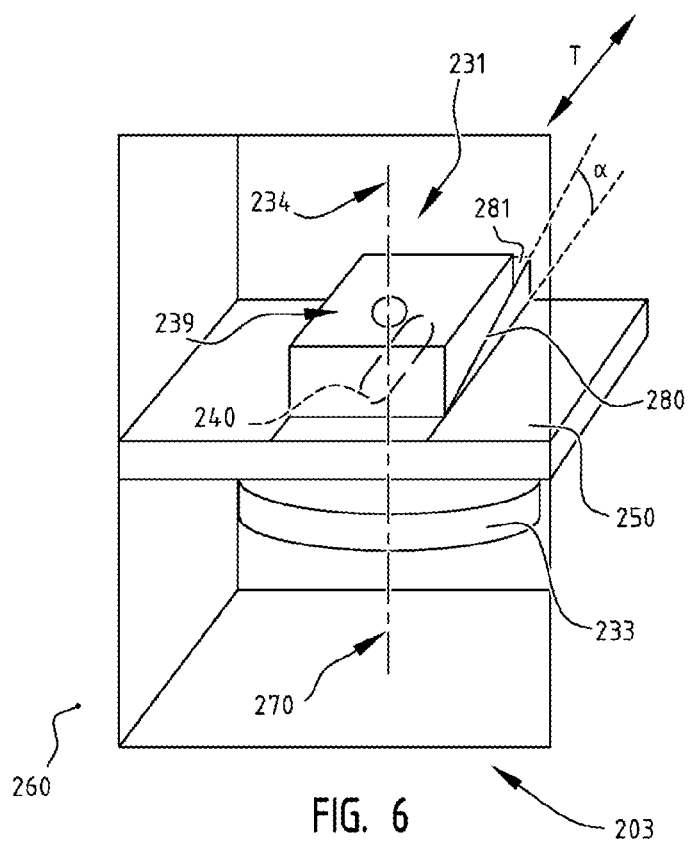

US 9,532,507 B2

GUIDE SYSTEM FOR A PLUNGER OF A RECTANGULAR BALER

This application is the US National Stage filing of International Application Serial No. PCT/EP2013/061988 filed on Jun. 11, 2013 which claims priority to Belgian Application BE2012/0395 filed Jun. 13, 2012, each of which is incorporated herein by reference in its entirety.

TECHNICAL FIELD

The present invention relates to a baler, in particular a rectangular baler comprising a plunger, and a guide system for the plunger.

BACKGROUND ART

In rectangular balers, bales are formed by compressing crop material in a bale chamber by a plunger that reciprocates in the bale chamber. The bale chamber typically comprises a top wall, a bottom wall, and two side walls. At one end of the bale chamber there is provided a plunger. The plunger is typically guided in the bale chamber using a plurality of guide rollers and corresponding guide tracks.

An example of a guide system with a plurality of horizontal and vertical rollers and corresponding tracks is disclosed in U.S. Pat. No. 3,059,569 in the name of the Applicant. The vertical rollers, i.e. the rollers with a vertical axis may be adjustable. Each vertical roller is carried on a vertical stud which passes through an elongated slot in a bracket of the plunger. The elongated slot extends in a direction transverse to the bale chamber, and provides a means whereby the roller can be adjusted toward and away from a track member. A problem with such a guide system is that due to the high forces exerted on the vertical rollers during a compression stroke, the studs carrying the vertical rollers may be pushed inward in the elongated slot, resulting in misalignment and damage of the guide system.

Another example of a guide system is disclosed in GB 1,161,650. This guide system uses a plurality of guide rollers having an axis making an angle of 45 degrees with respect to a horizontal plane. The guide tracks are arranged in the corners, along the longitudinal edges of the bale chamber. Also in such an embodiment the reaction forces exerted on the rollers during the compression stroke may be high and may lead to problems.

SUMMARY

The object of embodiments of the invention is to provide a baler which addresses the above mentioned problems, and in particular to provide a baler with an improved adjustable guide system.

According to an aspect of the invention there is provided a rectangular baler comprising a bale chamber adapted to contain one or more bales; a plunger adapted for reciprocating in the bale chamber to advance crop material in a discharge direction towards a discharge opening of the bale chamber; and a guide system adapted for guiding the reciprocating of the plunger in the bale chamber. The guide system comprises at least one guide assembly for aligning and supporting the plunger in a transverse direction perpendicular to the discharge direction. Each guide assembly includes a mounting piece with a guide element, a threaded shaft and at least one corresponding nut on said threaded shaft. The mounting piece is fixed with a mounting surface against a guide surface of a member. The mounting piece and the member have a through-hole and an elongated slot for the threaded shaft, respectively, or an elongated slot and a through-hole, respectively. The threaded shaft extends through the through hole and the elongated slot, and has an axis making an angle with respect to the guide surface which is smaller than 90°, when looking from the plunger towards the guide assembly in the discharge direction P.

During a compression stroke of the plunger, the mounting piece with guide element may be pushed in the transverse direction, towards the plunger. In an embodiment of the invention, the movement of the mounting piece in the transverse direction towards the plunger will be very limited, because of the angle of the guide surface with respect to the axis of the threaded shaft. Indeed, this angle causes the mounting piece to slide over the guide surface upward with respect to the member, hence tightening the nut/threaded shaft connection. Compared to the prior art, the mounting piece with mounting surface fixed against the guide surface as in the present invention ensures that the reaction forces exerted via the mounting piece on the threaded shaft during the compression stroke of the plunger can be dealt with in an improved way whilst maintaining the possibility to adjust the position of the guide element in the transverse direction through the provision of an elongated slot in the mounting piece or in the member. More in particular, the critical forces for moving the threaded shaft in the elongated slot will be much larger compared to the guide systems of the prior art, where the threaded shaft is perpendicular to the guide surface and mounting surface.

According to a preferred embodiment, the member having the elongated slot or through-hole is fixed to the plunger. In such an embodiment, the guide element will be guided along a wall of the bale chamber. According to an alternative embodiment the member could be fixed to the bale chamber, in which case the guide element would move along the reciprocating plunger.

According to a preferred embodiment, the member is provided with an elongated slot receiving the threaded shaft, and the mounting piece is provided with a through-hole for the threaded shaft. According to an alternative embodiment, the mounting piece may be provided with an elongated slot and the member with a through-hole. Both embodiments allow an adjustment in the direction of the elongated slot. Preferably, the elongated slot extends in the transverse direction. However, to further improve the resistance against reaction forces in the transverse direction, the elongated slot may also extend in a slot direction which makes an angle with respect to the discharge direction which is smaller than 90°, see also the Belgian patent application in the name of the Applicant filed on 10 Apr. 2012 with application No. BE 2012/0241.

According to a preferred embodiment, the threaded shaft is arranged vertically and the member is a horizontal plate having a top surface forming the guide surface and having a horizontal bottom surface, wherein the guide surface is inclined downwardly with respect to the bottom surface, when looking from the plunger towards the guide assembly in the transverse direction. When the guide element is a roller, such an embodiment has the advantage that the roller can be mounted such that the axis thereof extends vertically, wherein the roller is guided against a vertical plane of a wall of the bale chamber. However, according to an alternative embodiment, the members can also be inclined plates making an angle with the horizontal plane. Such an embodiment can for example be used in the baler of GB 1,161,650 discussed in the background section, see also the embodiments of FIGS. 7 and 7A which will be discussed below.

According to a preferred embodiment the guide element is a roller. According to alternative embodiments, the guide element could also be a friction block in a material with a low friction coefficient. The roller is preferably mounted rotatably around a vertical shaft on the mounting piece. This vertical shaft may be a separate shaft or may be the same as the threaded shaft used for fixing the mounting piece to the member.

According to a preferred embodiment, the guide assembly comprises an additional threaded shaft and at least one corresponding nut. The mounting piece may then have an additional mounting surface which is fixed against an additional guide surface of an additional member. Preferably, also the additional threaded shaft extends through the additional member and the mounting piece under an angle with respect to the additional guide surface which is smaller than 90°, when looking from the plunger towards the guide assembly in the discharge direction P. In that way, a very robust guide assembly is provided. Again, the additional member may be provided with an elongated slot and the mounting piece may be provided with an additional through-hole. Alternatively, the mounting piece could be provided with an additional elongated slot and the additional member could be provided with a through-hole. The additional member is preferably also fixed to the plunger and can be similar to the member discussed before.

According to a preferred embodiment, the compacting plunger has a first side wall and a second side wall, and the at least one guide assembly comprises a first guide assembly arranged at said first side wall, and a second guide assembly arranged at said second side wall.

According to a further developed embodiment, said guide system further comprises a plurality of horizontal rollers fixed to sidewalls of the plunger. Each horizontal roller has a horizontal rotation axis and is guided in a longitudinal track that is arranged against a side wall of the bale chamber and that extends in the discharge direction.

According to a preferred embodiment the guide system comprises a first horizontal guide track arranged to a first side of the bale chamber and a second horizontal guide track arranged to an opposite second side of the bale chamber. The plunger is provided with a first pair of horizontal rollers at the first side thereof, and a second pair of horizontal rollers at a second opposite side thereof. The first pair of horizontal rollers is guided and supported in the first horizontal guide track, and the second pair of horizontal rollers is guided and supported in the second horizontal guide track.

BRIEF DESCRIPTION OF THE FIGURES

The accompanying drawings are used to illustrate presently preferred non-limiting exemplary embodiments of the present invention. The above and other advantages, features and objects of the invention will become more apparent and the invention will be better understood from the following detailed description when read in conjunction with the accompanying drawings in which:

FIG. 4 is a view looking to the plunger looking from the inside of the bale chamber of the embodiment of FIG. 1;

FIG. 5 is a side view of the plunger in the bale chamber according to the embodiment of FIG. 1;

FIG. 6 illustrates a schematic perspective view of a variant of the guide assembly 131 used in the embodiment of FIGS. 1-5;

FIGS. 1, 2, 2A, 2B, 2C, 3, 4, 4A and 5 illustrate a part of a first embodiment of a baler of the invention. Only the parts relevant for understanding the present invention are illustrated. Other parts of the baler which are well known to the skilled person, such as the pre-compression chamber, the needle assembly, the knotter devices, the end part of the bale chamber with ejection system, etc. have been omitted. In the bale chamber 101 there is arranged a compacting plunger 103 which reciprocates between two side walls 106, 107. The bale chamber 101 has an inlet opening (not shown, below the plunger 103) and a discharge opening (not shown, at the end of the bale chamber in the discharge direction P). In operation, the compacting plunger 103 moves from a retracted position to an extended position in the direction of arrow P to advance bales towards the discharge opening. It will be understood that the bale chamber 101 extends further along the direction P of longitudinal movement of the plunger 103, in the usual manner of arranging a bale chamber and plunger.

Figure 1:
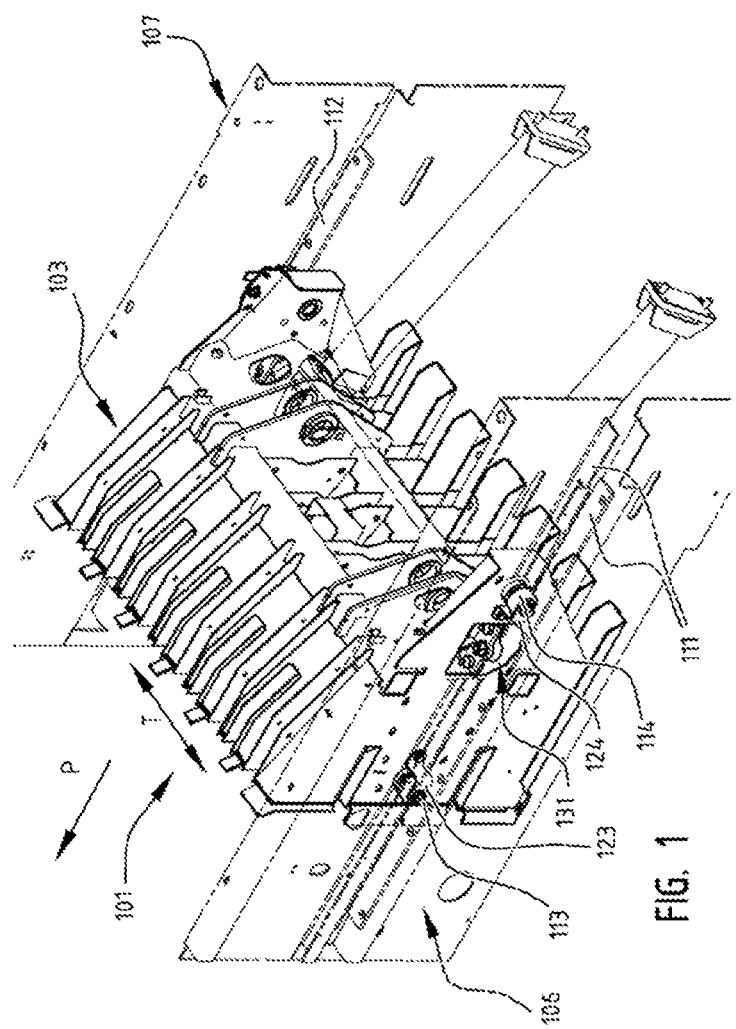
FIG. 1 is a schematic perspective view of an embodiment of a plunger with guide system in a baler according to the invention.

To guide the plunger 103 in the bale chamber 101, and to support it vertically in the bale chamber, horizontally extending guide tracks 111, 112 are affixed as a part of the bale chamber 101. The guide tracks 111, 112 support a first set of rollers 113, 114 at a first side 106 of the bale chamber, and a second set of rollers 115, 116 at the second side 107 of the bale chamber, respectively. The rollers 113-116 are suitably attached to the plunger 103, using in the illustrated embodiment brackets 123-126. The rollers 113-116 are in rolling contact with the guides 111, 112. The rollers 113-116 have a horizontal rotation axis and the guide tracks 111, 112 have guide surfaces which extend in a horizontal plane.

Figure 2:
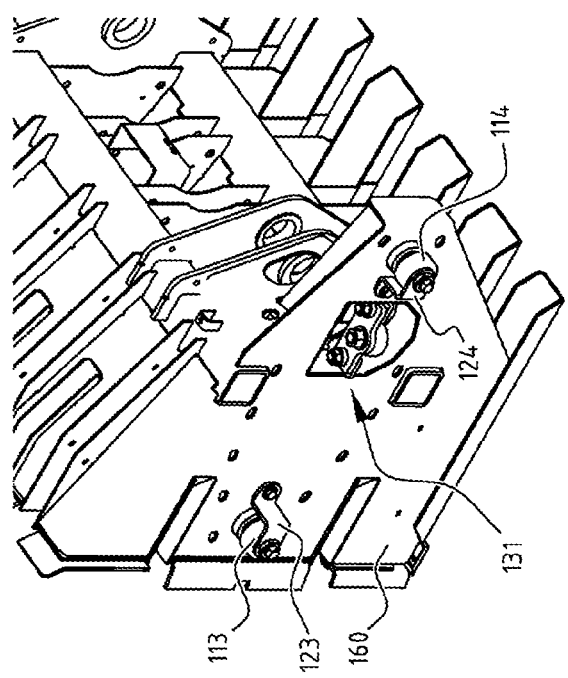
FIG. 2 is the same schematic perspective view of FIG. 1, wherein the sides with the tracks have been omitted to better illustrated a side of the plunger.

The guide system further comprises guide assemblies 131. The guide assembly 131 is best visible in FIGS. 2 and 2A. The guide assembly 131 comprises a guide element in the form of a roller 133 having a vertical rotation axis. The guide assembly 131 further comprises a mounting piece 139, a vertical threaded shaft 134 and a nut 135 for fixing the mounting piece 139 with roller 133 to the plunger 103.

Figure 2A:
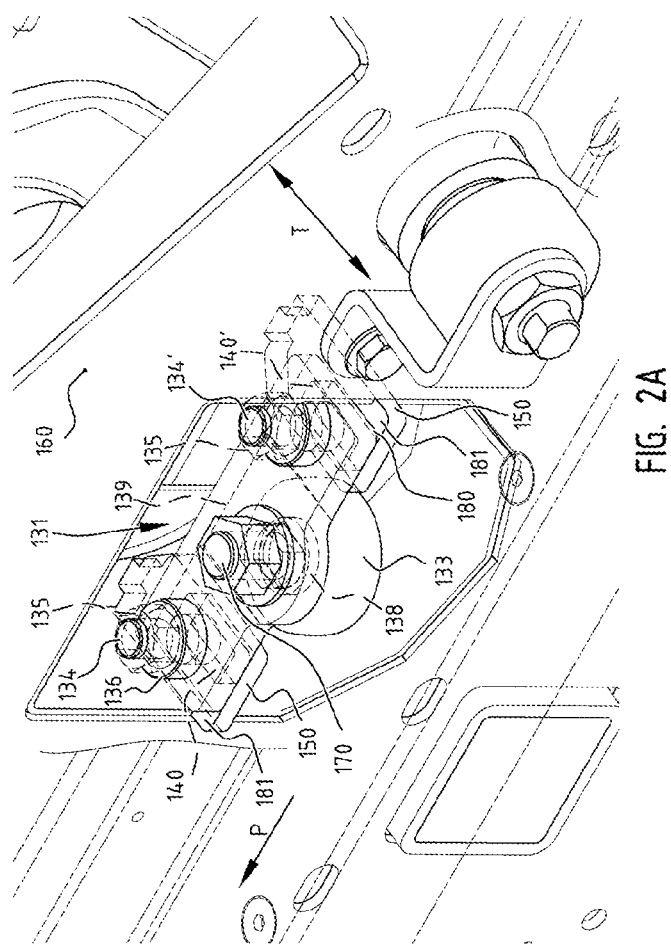
FIG. 2A is a detailed perspective view of a part of FIG. 2.
Figure 2B:
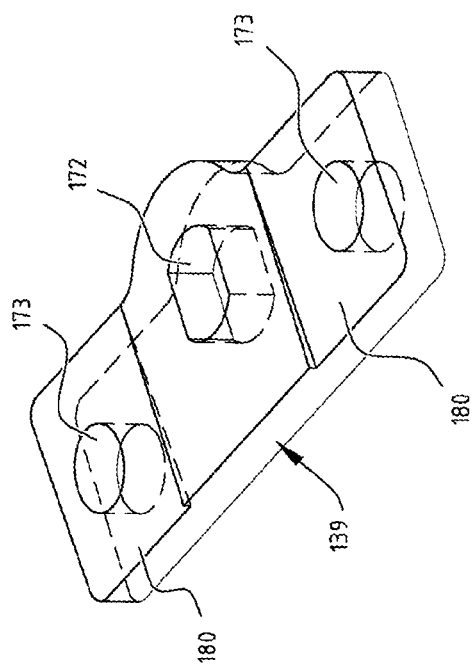
FIG. 2B is a detailed perspective view of the mounting piece of FIG. 2A.
Figure 2C:
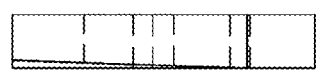
FIG. 2C is a side view of the mounting piece of FIG. 2B.
Figure 3:
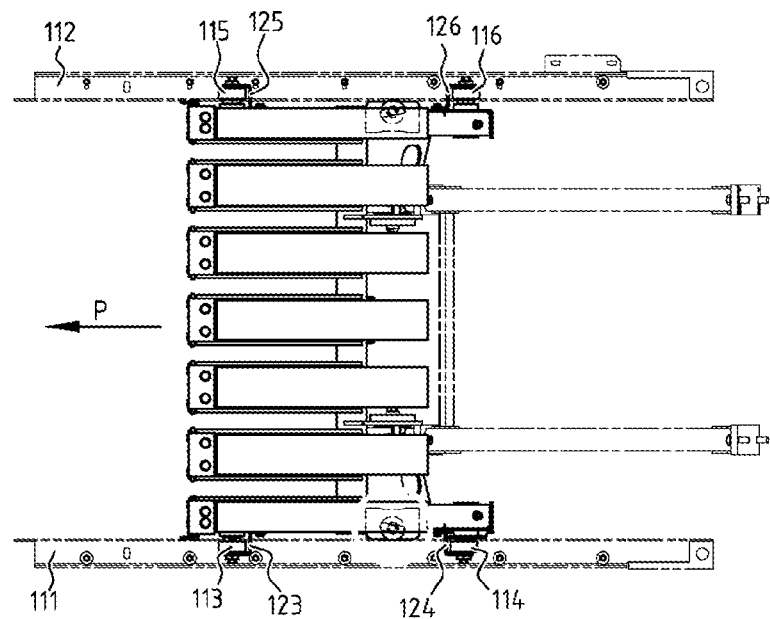
FIG. 3 is a schematic top view of a plunger with guide system of FIG. 1.
Figure 4A:
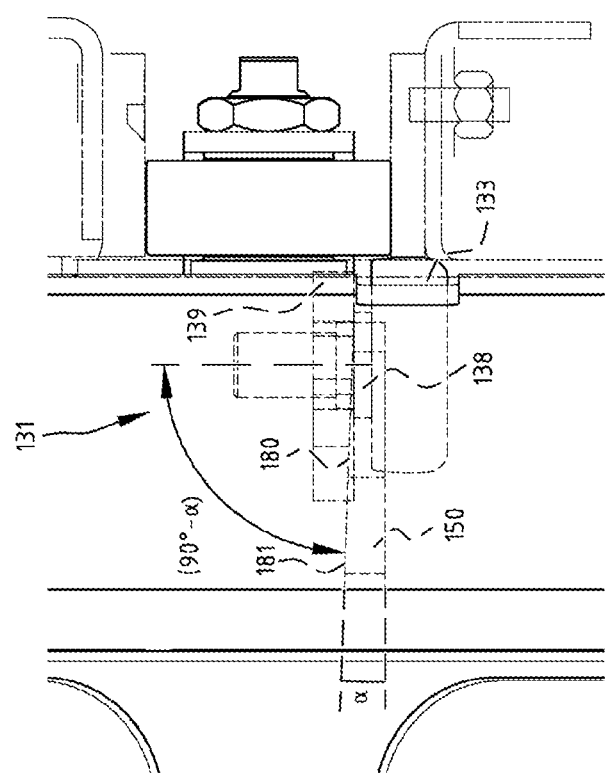
FIG. 4A is a detailed view of a part of FIG. 4.

As best illustrated in FIGS. 2A, 2B and 4A, the mounting piece 139 has a mounting surface 180 which is fixed against a guide surface 181 of a horizontal plate 150. Each horizontal plate 150 is provided with an elongated slot 140 extending in a transverse direction, see FIG. 2A. In that way the position of the roller 133 can be adjusted in the transverse direction. The horizontal plate 150 has a horizontal bottom surface and an inclined top surface part which functions as the guide surface 181. In the illustrated embodiment, the mounting piece 139 has two mounting surfaces 180 which are fixed against two respective guide surfaces 181. The mounting piece 139 has two through holes 173 for respective threaded shafts 134. Further, the mounting piece 139 has a through-hole 172 for a shaft 170 for connecting the roller 133 to the mounting piece 139. The guide surface 181 is inclined over an angle α with respect to a horizontal plane, see FIG. 4A. The threaded shafts 134 extend vertically and hence make an angle which is smaller than 90° with the guide surface 181, when looking from the plunger 103 towards the guide assembly 131 in the discharge direction P. Also, the mounting surface 180 is inclined with respect to the horizontal plane, while the top surface of the mounting piece 139 extends in a horizontal plane. The threaded shafts 134 are mounted vertically and tightened using nuts 135 and rings 136.

From FIG. 4A it is understood that if the mounting piece 139 were to be moved inwardly towards the plunger 103 due to the high reaction forces during the compression stroke of the plunger, the mounting piece 139 would slide upward along the guide surfaces 181 tightening the connection realized through the nuts 135 and the threaded shafts 134.

According to a preferred embodiment, the guide assemblies 131 are symmetrical to each other, allowing an adjustment in a direction transverse to the longitudinal direction L of the bale chamber at both sides 106, 107 of the plunger 103. As best shown in FIG. 2A, the elongated slots 140 extend in a transverse direction over a length which allows adjusting the position of the roller 133 in the transverse direction. The width dimensions of each slot 140 are slightly bigger than the diameter of the threaded shaft 134 in order for the threaded shafts 134 to be able to pass freely through the elongated slots 140. Further, the roller 133 has a shaft part 138 with a diameter which is larger than the diameter of a through-hole 172 for the shaft 170 for mounting the roller 133. This shaft part 138 is fixed against the mounting piece 139 such that the wheel of the roller is located at a distance of the mounting piece 139.

FIG. 6 illustrates another possible embodiment of a guide assembly comprising a roller 233, a mounting piece 239, and a threaded shaft 234 for a nut (not illustrated) to fix the mounting piece 239 and the roller 233. In the illustrated embodiment of FIG. 6, the guide assembly comprises only one member 250 fixed in a recess of a wall 260 of a plunger 203 and one mounting piece 239. The bottom surface of the member 250 is oriented horizontally. The top surface of the member 250 is provided with a guide surface 281 which is inclined under an angle α with respect to a horizontal plane. The mounting piece 239 has a complementary mounting surface 280 which is also inclined under an angle α with respect to a horizontal plane. A threaded shaft 234 (only the axis of the threaded shaft 234 is illustrated schematically) extends vertically and hence makes an angle with the guide surface 281 which is smaller than 90°, when looking from the plunger towards the guide assembly in the transverse direction. The member 250 is provided with an elongated recess extending in the transverse direction T. The fixation of the mounting piece against the member 250 may be done using a shaft 234 (not illustrated) which is also used to mount the roller 233 rotatably around a vertical axis. In such an embodiment with a common axis for the roller and the threaded shaft, the elongated slot 240 must be provided in the member 250 in order to achieve the adjustability in the transverse direction T.

The skilled person will understand that still other embodiments are possible using the principles of the invention. In the first embodiment, instead of arranging the elongated slots 140 in the respective horizontal plates 150, the elongated slots 140 could also be arranged in the mounting piece 139. Further, instead of welding the horizontal plates 150, 250 in the recess of the plunger wall 160, 260, the horizontal plate 150, 250 could also be fixed using bolts. Further, in the embodiments the transverse direction T is shown to be in a horizontal plane. However, it is also possible to use embodiments of the disclosed guide assemblies between the top wall of the bale chamber and the top wall of the plunger, in which case the transverse direction T extends in a vertical plane perpendicular to the discharge direction P.

Figure 7:
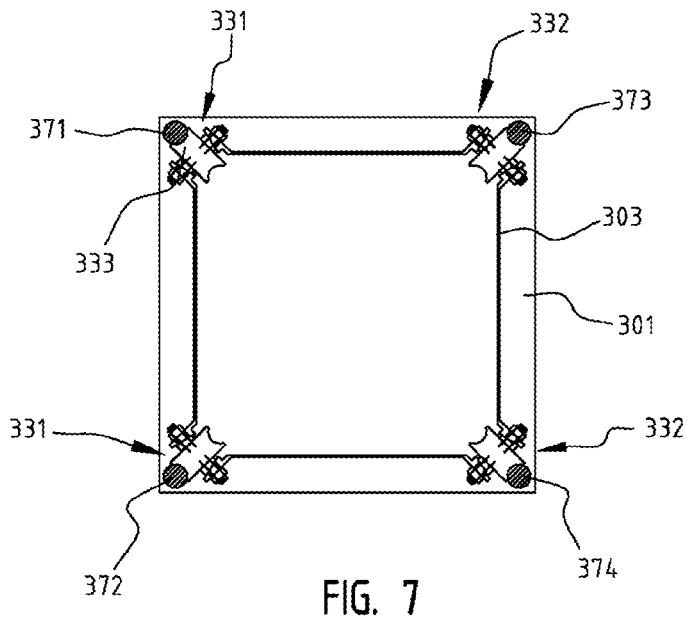
FIG. 7 illustrates schematically another embodiment of a plunger with guide system in a bale chamber according to the invention.
Figure 7A:
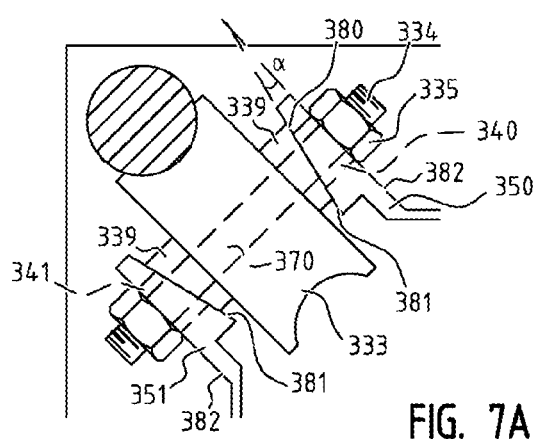
FIG. 7A is a schematic perspective view of a detail of the embodiment of FIG. 7.

Now a third embodiment of a baler according to the invention will be disclosed with reference to FIGS. 7 en 7A. In this embodiment four guide tracks 371-374 are provided along the four edges of the bale chamber 301. Rollers 333 are inclined under an angle of 45 degrees with respect to the horizontal plane. Each roller 333 is mounted between inclined plates 350, 351 which are fixed to the plunger 303. As best shown in FIG. 7A, each plate 350, 351 is provided with a guide surface 381 which is inclined with respect to an opposite surface 382 of the members 350, 351. Further, there are provided mounting pieces 339 having a mounting surface 380 in contact with the guide surface 381 of the respective members 350, 351. The guide surface 381 makes an angle α with respect to the opposite surface 382. A nut 335 abuts against this opposite surface 382. The threaded shaft 334 makes an angle (90°-α) with respect to the guide surface 381 when looking in the transverse direction from the plunger 303 towards the guide assembly. Also, in this embodiment, if the roller 333 were to be pushed inward during the reciprocating movement of the plunger, this will move the mounting piece 339 and threaded shaft 334 inward, resulting in a tightening of the nut and threaded shaft connection. Note that the members 350, 351 are provided with transverse elongated slots 340, 341 allowing adjusting the position of the roller 333.

While the principles of the invention have been set out above in connection with specific embodiments, it is to be understood that this description is merely made by way of example and not as a limitation of the scope of protection, which is determined by the appended claims.

The invention claimed is:

1. A rectangular baler comprising:
    a bale chamber adapted to contain one or more bales;
    a plunger that reciprocates in the bale chamber to advance crop material in a discharge direction towards a discharge opening of the bale chamber;
    a guide system that guides the plunger in the bale chamber; said guide system comprising at least one guide assembly that aligns and supports the plunger in a transverse direction perpendicular to the discharge direction;
    each guide assembly including a mounting piece with a guide element, a threaded shaft and at least one nut that fixes said threaded shaft;
    wherein said mounting piece has a mounting surface that is fixed against a guide surface of a member; said mounting piece and said member receive the threaded shaft, via an elongated slot and a through-hole, or a through-hole and an elongated slot;
    said threaded shaft extending through said through-hole and said elongated slot and being tightened with said at least one nut;
    said threaded shaft having an axis making an angle with respect to said guide surface, the angle being smaller than 90 degrees, when looking from the plunger towards the guide assembly in the discharge direction.

2. The rectangular baler of claim 1, wherein said member is fixed to the plunger, and said guide element is movable along the bale chamber.

3. The rectangular baler of claim 1, wherein said member is provided with the elongated slot receiving said threaded shaft; and said mounting piece is provided with the through-hole for said threaded shaft.

4. The rectangular baler of claim 1, wherein said mounting piece is provided with the elongated slot receiving said threaded shaft; and said member is provided with the through-hole for said threaded shaft.

5. The rectangular baler of claim 3, wherein said elongated slot extends in the transverse direction.

6. The rectangular baler of claim 3, wherein said elongated slot extends in a slot direction making an angle with respect to the discharge direction.

7. The rectangular baler of claim 1, wherein said threaded shaft is arranged vertically and said member is a horizontal plate having said guide surface as a top surface and having a horizontal bottom surface, said guide surface being inclined downwardly when looking from the plunger towards the guide assembly in the transverse direction.

8. The rectangular baler of claim 1, wherein said member is a plate making an angle with a horizontal plane, said plate having the guide surface and an opposite surface, and said threaded shaft being arranged in an inclined position with respect to the horizontal plane perpendicular to said opposite surface.

9. The rectangular baler of claim 1, wherein the guide element is a roller.

10. The rectangular baler of claim 9, wherein said roller is mounted rotatably around a vertical shaft on the mounting piece.

11. The rectangular baler of claim 1, wherein the or each guide assembly comprises an additional threaded shaft and at least one corresponding nut; wherein said mounting piece has an additional mounting surface fixed against an additional guide surface of an additional member, said additional threaded shaft extending through said additional member and said mounting piece to fix said mounting surface against said additional guide surface; said additional threaded shaft having an axis making an angle with respect to said additional guide surface, the angle being smaller than 90 degrees, when looking from the plunger towards the guide assembly in the discharge direction.

12. The rectangular baler of claim 1, wherein said at least one guide assembly comprises a first guide assembly and a second guide assembly, wherein said first guide assembly is arranged at a first side of the plunger, and said second guide assembly is arranged at an opposite second side of the plunger.

13. The rectangular baler of claim 1, wherein said guide system further comprises a plurality of horizontal rollers and corresponding horizontal guide tracks, each horizontal roller having a horizontal rotation axis and being fixed to the plunger, and each horizontal track extending in the discharge direction and being fixed to a side wall of the bale chamber.

14. The rectangular baler according to claim 12, wherein the guide system further comprises a first horizontal guide track arranged to a first side of the bale chamber and a second horizontal guide track arranged to an opposite second side of the bale chamber; and wherein said plunger is provided with a first pair of horizontal rollers at a first side thereof and a second pair of horizontal rollers at a second opposite side thereof, said first pair of horizontal rollers being guided and supported in said first horizontal guide track, and a second pair of horizontal rollers being guided and supported in said second horizontal guide track.

* * * * *